Aug. 31, 1926.
W. V. VAN ETTEN
1,598,331
DIRIGIBLE SPOTLIGHT
Filed Nov. 1, 1924
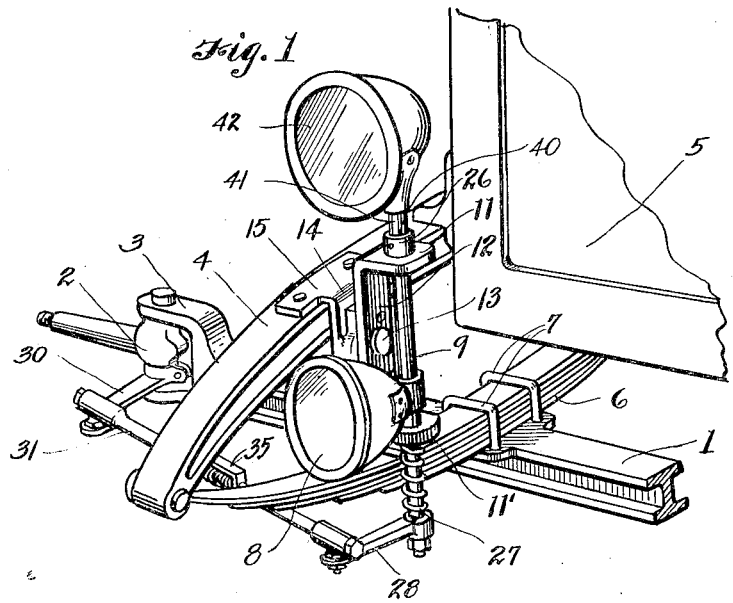
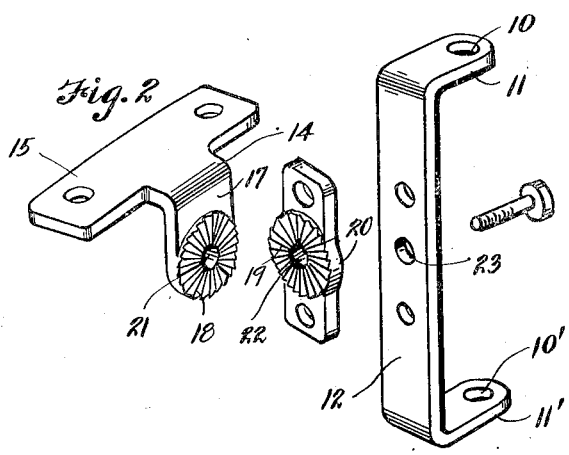
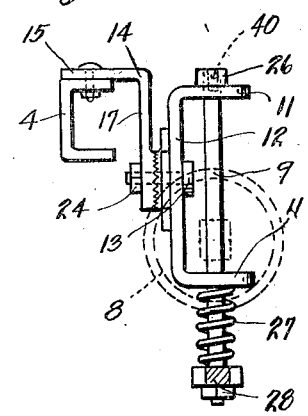
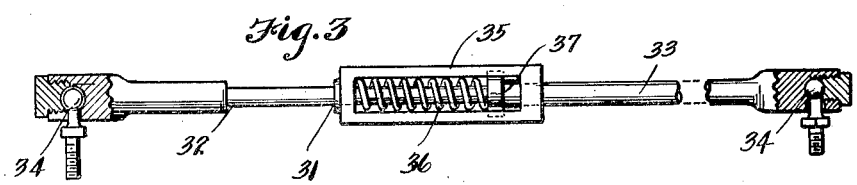
INVENTOR
WILLIAM V. VAN ETTEN
BY
Richard J. Cook
ATTORNEY Patented Aug. 31, 1926.

1,598,331

UNITED STATES PATENT OFFICE.

WILLIAM V. VAN ETTEN, OF EVERETT, WASHINGTON.

DIRIGIBLE SPOTLIGHT.

Application filed November 1, 1924. Serial No. 747,267.

This invention relates to spot lights for motor vehicles such as automobiles, trucks, etc., and more particularly to dirigible spot lights for use on vehicles of the above character wherein the front supporting springs extend longitudinally with respect to the vehicle frame and forwardly of the radiator.

It is the principal object of the invention to provide a spot light having a supporting standard operatively connected with one of the steering wheel supporting knuckles so that the direction of light from the lamp will be made to follow the direction of travel of the vehicle.

Another object of the invention resides in the provision of a supporting bracket for the lamp of an improved type which permits different adjustments of the lamp whereby the light may be made to strike the roadway at different distances in front of the vehicle.

Other objects reside in the various details of construction and combination of parts embodied in the invention and in their mode of operation.

In accomplishing these and other objects, I have provided the improved details of construction, the preferred forms of which are illustrated in the accompanying drawings, wherein—

Figure 1 is a perspective view of the forward part of an automobile, showing a dirigible spot light embodied by the present invention, mounted thereon.

Figure 2 is a detail, perspective view of several parts of the supporting bracket shown in disassembled relation.

Figure 3 is a view, partly in section, of the connecting rod that joins the steering arms of the lamp post and steering knuckle.

Figure 4 is a front view of the lamp and its support, the lamp being shown in dotted lines in order to better illustrate the bracket.

Referring more in detail to the drawings—

1 designates the front axle of an automobile or the like, having a front wheel steering knuckle 2 pivotally mounted in the yoke 3 at the end of the axle; and 4 designates one of the longitudinal beams of the chassis, or frame, of the vehicle that extends forwardly of the radiator 5 with its forward end bent downwardly and attached to the forward end of a spring 6; the latter being of the usual type used and extending parallel with the beam and secured to the axle by U-bolts 7.

The spotlight, designated at 8, is mounted on the central portion of a standard or rod 9 which, in turn, is rotatably mounted in openings 10—10' in the laterally turned portions 11—11' at the upper and lower ends, respectively, of a bracket 12. This bracket is adjustably fixed, by means of a bolt 13, to a bracket 14 that is bolted, riveted, or otherwise attached to the forward end of the beam 4.

The bracket 14 is formed with a horizontal flange 15 that overlies the top of the beam 4 and which receives the bolts or rivets whereby it is secured, and has a vertical flange 17 depending along the inner side of the beam equipped with a circular roughened, knurled or corrugated surface 18 against which a correspondingly formed surface 19 on a plate 20 that is riveted to bracket 12, engages. The flange 17, plate 20 and bracket 12, respectively, have registering openings 21, 22, and 23, therethrough for receiving the bolt 13 and this is equipped with a nut 24 that may be tightened on the bolt to retain the adjustment of the lamp mounting bracket 2 at different degrees of inclination.

Fixed about the upper end portion of rod 9 is a collar 26 which rests upon the upper flange 11 of bracket 12 and about the lower end of the rod is a coiled spring 27 that bears against the lower flange 11' and against the mounting portion of a steering arm 28 that is fixed on the lower end of the rod and which extends forwardly therefrom.

Fixed to the steering knuckle 3 and extending forwardly therefrom is an arm 30 and attached thereto and to the forward end of the arm 28 is a connecting rod 31 by means of which the lamp supporting rod 9 is caused to rotate in accordance with the rotative movement of the steering knuckle. The rod 31 preferably comprises two sections 32 and 33 having ball and socket connections at their ends with the arms, as designated at 34 in Figure 3. The rod section 33 carries a link 35 in which the adjacent end of rod section 32 is slidably contained and a spring 36 that is coiled about the end of rod 32 bears against one end of the link and against a head 37 on the rod to provide a yieldable connection that lessens the vibration between the lamp and steering knuckle and permits variation due to spring deflection.

The upper end of shaft 9 is provided with a threaded bore 40 adapted to receive therein the mounting standard 41 of a headlight 42, as shown in Figure 1, if it should be desired to use a headlight in that position in addition to the spotlight. However, this would not ordinarily be done.

With the parts so constructed and assembled, it is possible by loosening bolt 13, to tilt the bracket 12 so as to cause the light from lamp 8 to be cast into the road far or near to the vehicle and this adjustment may be retained by tightening the nut on the bolt. The light also will be caused to move from side to side in accordance with the turning movement of the steering knuckle and in this way may be caused to follow the roadway forwardly of the car.

Having thus described my invention, what I claim as new therein and desire to secure by Letters Patent, is:

In a vehicle of the class described, the combination with a longitudinal frame beam having an end portion extended forwardly of the vehicle and a front wheel steering knuckle, of a bracket supporting plate comprising a horizontal flange overlying and secured to said beam, and a downturned vertical flange provided with a knurled surface and an aperture therethrough, a lamp mounting bracket comprising a flat body portion with laterally turned apertured end portions and having a knurled surface centrally on the body portion adapted to coincide with the knurled surface of the vertical flange and having an aperture therethrough in registration with the first named aperture, a bolt extended through said apertures on which the bracket may be tilted forwardly or rearwardly and whereby it may be locked at different positions; a lamp supporting standard extended rotatably through said apertured end portions of the bracket, a steering arm fixed to the lower end of said standard, an arm fixed to the steering knuckle and a rod pivotally connected at its ends to the ends of said arms.

Signed at Seattle, King County, Washington, this 23rd day of October 1924.

WILLIAM V. VAN ETTEN.